United States Patent [19]

Elliott et al.

[11] Patent Number: 5,220,745
[45] Date of Patent: Jun. 22, 1993

[54] DRIP IRRIGATION APPARATUS FOR POTS AND PLANTERS

[75] Inventors: John B. Elliott, Temecula; Samuel Tobey, Culver City; John S. DeCell, Temecula, all of Calif.

[73] Assignees: Irrigation Technologies, Inc., Houston, Tex.; Salco Products, Inc., Hawthorne, Calif.

[21] Appl. No.: 797,191

[22] Filed: Nov. 25, 1991

[51] Int. Cl.$^5$ .............................................. A01G 25/00
[52] U.S. Cl. .............................................. 47/79; 47/62
[58] Field of Search ................ 47/59, 62, 79, 82, 48.5

[56] References Cited

U.S. PATENT DOCUMENTS

| | | | |
|---|---|---|---|
| 2,983,076 | 5/1961 | Merrill | 47/62 |
| 3,053,011 | 9/1962 | Silverman | 47/79 |
| 3,085,364 | 4/1963 | Chapin | 47/79 |
| 3,482,785 | 12/1969 | Chapin | 239/542 |
| 3,686,792 | 4/1972 | Barfield | 47/79 |
| 3,981,446 | 9/1976 | Hunter | 47/79 |
| 4,121,608 | 10/1978 | MacLeod | 137/78 |
| 4,148,155 | 4/1979 | Allen | 47/59 |
| 4,183,176 | 1/1980 | Barfield | 47/79 |
| 4,651,468 | 3/1987 | Martinez | 47/80 |
| 5,020,275 | 6/1991 | Bednarzik | 47/79 |

Primary Examiner—Henry E. Raduazo
Attorney, Agent, or Firm—Calif Kip Teruo

[57] ABSTRACT

Drip irrigation apparatus for a container having a plant growing therein in soil in the container including a through access opening preferably in the side of the container. A length of tubing extending from outside to inside the opening and an inside and an outside female adapter secured on opposite ends of the length of tubing by threaded connections or by bonding. The adapters have larger diameters than the opening and a washer on the length of tubing so that the opening is sealed against loss of soil therethrough. The inside adapter and the outside adapter have extending inwardly and outwardly thereof respectively an inside barbed fitting and an outside barbed fitting. Inside flexible tubing at one end connecting to the inside fitting to direct water to irrigate inside the containers. Inside flexible tubing at one end connecting to the outside flexible tubing and connecting at the other end to a source of water. A male adapter can be substituted for one female adapter and the length of tubing.

10 Claims, 2 Drawing Sheets

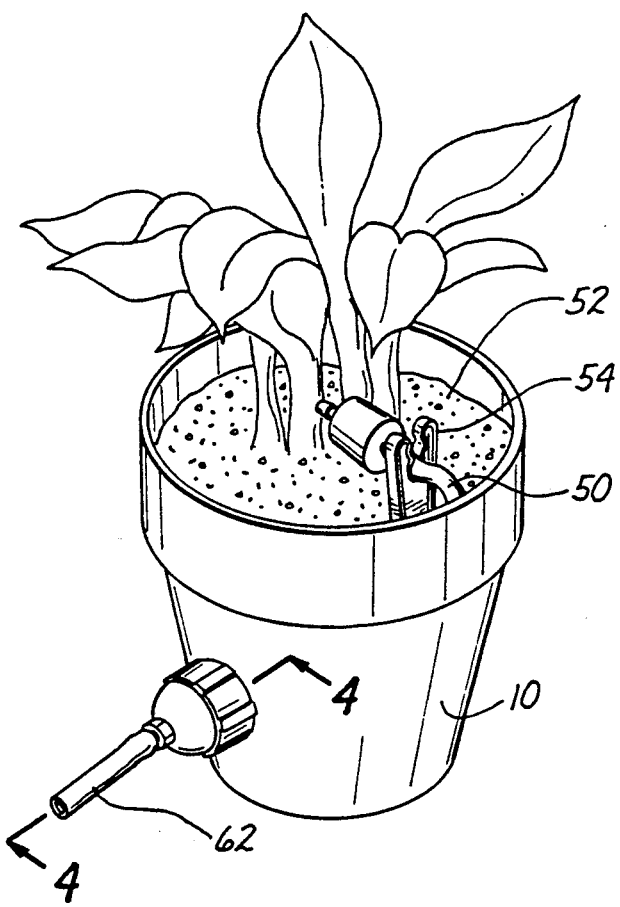
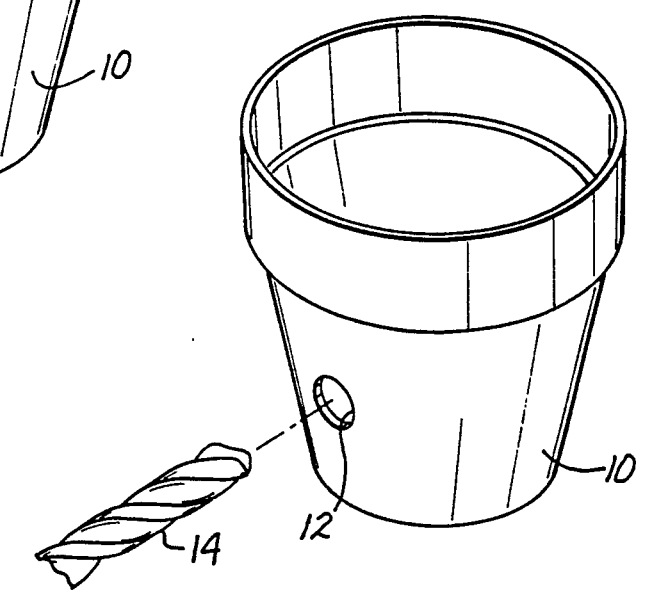
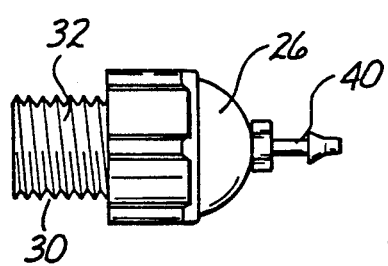
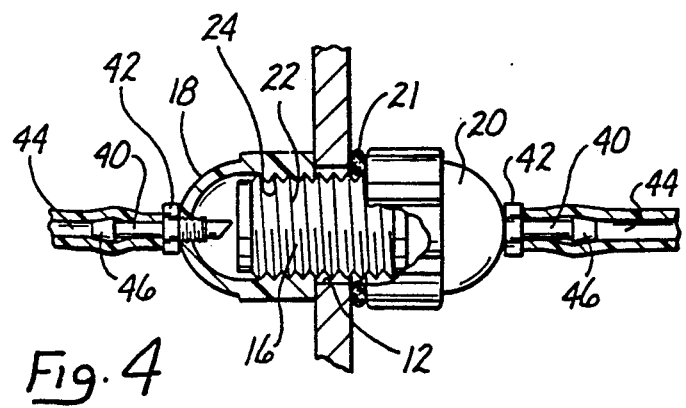

DRIP IRRIGATION APPARATUS FOR POTS AND PLANTERS

BRIEF SUMMARY OF THE INVENTION

Background and Objectives

Our invention relates to improved drip irrigation apparatus for containers for plants such as pots and planters.

In the past the common way to apply drip irrigation to a container for plants such as pots and planters has been to drape drip irrigation tubing over the edges of such containers. It is an objective of our invention to provide more satisfactory apparatus to irrigate plants in such containers including:
(a) providing a better looking installation,
(b) devising a system that will stay in place against accidental dislodgement or even light vandalism,
(c) designing apparatus that is economical, is easy to install, is durable, requires minimum maintenance, and adapts to different sized containers, to different plants and to different irrigation requirementsor preferences.

Our invention will be best understood, together with additional objectives and advantages thereof, from the following description, read with reference to the drawings, in which:

DRAWINGS

FIG. 1 is a perspective view of a specific embodiment of our invention including a plant container, a plant and soil in the pot, and part of our drip irrigation apparatus.

FIG. 2 is a perspective view showing a side opening in the container and indicating drilling of a container not manufactured with a side opening.

FIG. 4 is an enlarged elevational view, partly in section, taken on line 4—4 of FIG. 1.

FIG. 5 is an elevational view of a male adapter.

DESCRIPTION

Figure 3:
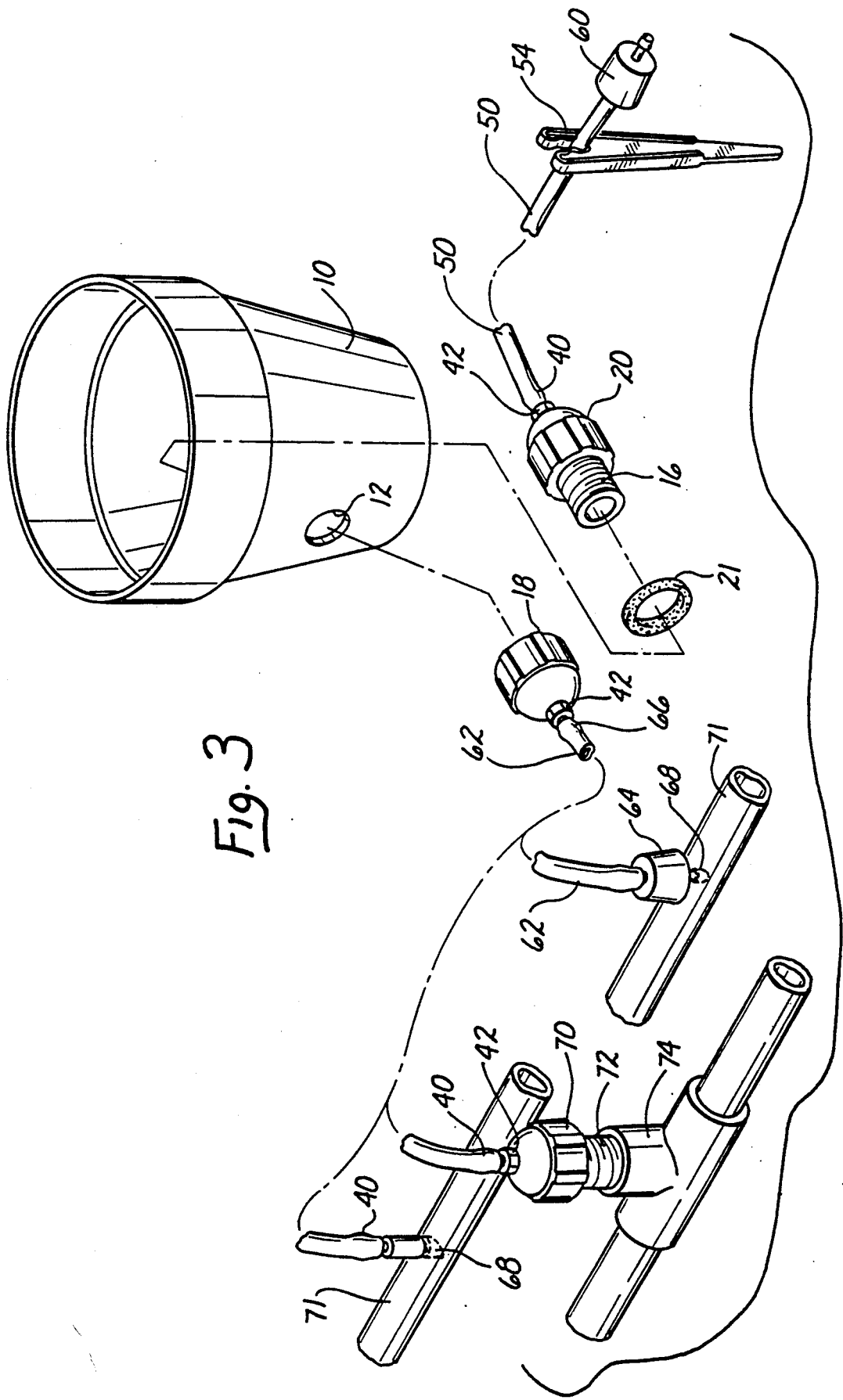
FIG. 3 is a perspective view in exploded form showing a container with a side opening and various components of our drip irrigation apparatus.

This invention was devised to provide an efficient and aesthetically pleasing method of irrigating a container for plants. Many landscapes incorporate the use of planters which can create a maintenance problem in that they must be watered manually. Manual watering often is done improperly resulting in a high incidence of plant replacements due to over or under watering. If drip irrigation is used to water potted plants, the drip irrigation tubing is often run over the sides of the planters. That is certainly not an optimum installation method because it detracts from the aesthetic values intended and creates a vandalism problem as well. Because of the problems, a need arises for a cost effective method to properly adapt drip irrigation to various types of containers for plants.

In the claims the expression is used of "container" to encompass the various types of planters in which plants may be grown whether they be called "pots", "planters", "containers", etc. and whether they are formed of terra cotta or clay, concrete, plastic, ceramic, wood or other materials. Sizes and shapes of containers vary, i.e., a 6" or 8" clay pot, wood through 12" square, a wood planter two feet or more in length. Wall thicknesses also vary, i.e., a plastic planter having walls less than ¼" in thickness, a ceramic or clay pot ⅜-3/8 in wall thickness, or a concrete trough as much as several inches in wall thickness.

Some prior containers have bottom openings for drainings. No containers known to us have side openings for the purpose of entry of drip irrigation lines. The drawings show a container 10, that may be taken as being a clay pot, with a side opening 12. Usually this will be a round opening because it suits essentially tubular irrigation tubes that usually will be used to pass through opening 12 but other shapes would be possible. In FIG. 2, the drill 14 shown demonstrates that if a pot is to be used that is not premanufactured with a side opening 12 then such an opening can be drilled. Our drip irrigation apparatus can be sold in kit form, with or without a container 10, and one possibility in kits without containers is to provide a drill 14 as part of the kit. Opening 12 preferably should be in the lower portion of container 10 as it will be less obtrusive. It would be possible to enter the container 10 with drip irrigation apparatus through a bottom opening but that course of action usually would be impractical because the drip irrigation apparatus entering the bottom would interfere with the normal setting of a flat bottom on the container directly on a flat supporting surface, i.e., concrete or wood patio or deck, bench, shelf, etc. On a hanging container, it may be possible to locate drip irrigation side entry in a less obtrusive position than hanging from the bottom of the container.

Usually the line passing through the opening 12 will be of a half-inch interior diameter which means the exterior diameter would make a nice fit passing through a three-quarters inch diameter opening 12. The tubular body 16 passing through opening 12 commonly will be PVC or other plastic common in drip and other landscape irrigation and can be relatively firm or rigid as flexibility in tubular body 16 would not serve a purpose. In that form, it is suggested that a six inch piece be provided, which sometimes would be needed in passing through the walls of a concrete planter. One form of tubular body is shown in FIG. 4 in which it is separate from an outside female adapter 18 and an inside female adapter 20. Tubular body 16 can have threads 22 (as shown in FIG. 4) or be unthreaded and adapters 18, 20 can have threads 24 or be unthreaded, to either be threadedly connected or to be bonded together. A washer 21 is disposed over tube 16 and between inside adapter 20 and opening 12 to seal the same.

When the expression "a length of tubing" is used in the claims in connection with tubular body 16, the expression includes tubes, pipes or hose, whether rigid or flexible.

Another form of tubular body passing through opening 12 is the use of a male adapter 26 (FIG. 5) on one side of opening 12 and a female adapter 18 on the other side of opening 12 in the manner of FIG. 4. In both the FIG. 4 form of the invention and the FIG. 5 form of the invention a tubular body passes through opening 12 but in the FIG. 5 form of the invention the tubular part 30 of male adapter 26 is formed as an integral part of the male adapter 26. Usually male adapter tubular part 30 will have threads 32 to be threadedly engaged with threads 24 in female adapter 18. Tubular part 30 of male adapter 26 usually will be relatively short, i.e., can be used with containers of a maximum wall thickness of one-half inch. This limits the use of the FIG. 5 construction, i.e., even if more than one length of tubular part 30 were manufactured, it would not have the wide adaptability to different wall thickness found in the FIG. 4 form of the invention in which a length of tubing (i.e. ¼×6″) can be cut to needed length. Of course if male adapter 26 were manufactured with a six inch tubular part 30 it would be possible to cut part 30 as needed.

Male adapter 26 can be formed several ways. One form is to bond a tubular body 16 in the adjacent portion of a female adapter 20. Another way is to mold the unit with a generally cylindrical passageway except in the end having barbed fitting 40. A third way would be essentially to split male adapter 26 longitudinally, i.e., to form to halves and bond them together.

Adapter parts 18, 20, 26, are termed "adapters" in the trade and in this specification and appended claims because they are transition parts between (a) generally ¼″ interior diameter firm or rigid tubing, i.e., PVC, polyethylene, or metal pipe and (b) ¼″ interior diameter flexible plasticized PVC tubing.

The female adapters 16, 18, if threaded can be threadedly engaged to such pipe, i.e., an irrigation riser with a threaded upper end. If the riser had a smooth end, then a female adapter without threads could be secured by bonding. A male adapter could be threadedly secured or bonded to a riser by an intervening coupler or union.

Adapter parts 18, 20, 26, are attached to ¼″ tubing by barbed fittings 40 threadedly connected to the adapter parts and having a nut surface for use of wrenches or pliers. Barbed fittings 40 have bosses 44 to fit in the end of the ¼″ tubing with barbed surfaces 46 tapering in the engaging direction and flaring in the disengaging direction. However, as is known in the trade, if the ¼″ plasticized PVC tubing doesn't stay on a barbed surface, a high pressure clamp can be used to clamp the tubing to the barb.

An inside flexible ¼″ tubing 50 connects to the barbed fitting 40 inside container 10. Tubing 50 could outlet inside the container below the top of soil 52 or tubing 50 can be brought to a level above the top of soil 52 to have its end supported by a stake 54. That end of tubing 50 can have a variety of dispensing modes, i.e., a bubbler nozzle, a drip emitter 60 (as shown in FIG. 3), etc. Flow control can be incorporated in the bubbler, drip emitter, etc. or flow control can be incorporated elsewhere in the system as will be understood by those skilled in the art.

An outside flexible ¼″ tubing 62 connects to the barbed fitting 40 outside container 10. Tubing 62 connects to a source of water such as an emitter 64 with a barbed fitting 66 at one end securing inside ¼″ tubing 62 and with a barbed fitting 68 punched into a flexible PVC or polyethylene pipe 71. Tubing 62 instead can connect to a female adapter 70 secured to a riser 72 extending from a TEE 74 (or ELL) of a rigid water conduit (PVC, metal, etc.). Those skilled in the art will understand the manners of supplying outside ¼″ tubing 62 with water from various sources.

Having thus described our invention, we do not wish to be understood as limiting ourselves for the exact construction shown and described. Instead, we wish to cover those modifications of our invention that will occur to those skilled in the art upon learning of our invention and which are within the proper scope thereof.

We claim:

1. Drip irrigation apparatus for a clay pot having a plant growing therein in soil in said pot, comprising:

(a) said pot having a straight round through opening in its side, (b) a length of firm PVC tubing extending from outside of said opening to inside of said opening and generally fitting said opening, (c) an inside adapter and an outside adapter on opposite ends of said length of tubing in abutting relationship to said pot on the inside and outside thereof respectively, said adapters having larger outside diameters than the diameter of said opening whereby said adapters seal said opening against loss of said soil therethrough, and (d) said inside adapter and said outside adapter having extending inwardly and outwardly thereof respectively an inside barbed fitting and an outside barbed fitting, inside flexible tubing at one end connecting to said inside fitting to direct water to irrigate inside of said pot and outside flexible tubing at one end connecting to said outside fitting and having connecting means on the other end of said outside flexible tubing adapted to connect to a source of water outside of said pot and a tubing stake engaged in said soil and supporting the other end of said inside flexible tubing.

2. Drip irrigation apparatus for a container having a plant growing therein in soil in said container, comprising:

(a) said container having a straight round through opening in its side, (b) a length of tubing extending from outside of said opening to inside of said opening and generally fitting said opening, (c) an inside adapter and an outside adapter on opposite ends of said length of tubing in abutting relationship to said container on the inside and outside thereof respectively, said adapters having larger outside diameters than the diameter of said opening whereby said adapters seal said opening against the loss of said soil therethrough, and (d) said inside adapter and said outside adapter having extending inwardly and outwardly thereof respectively an inside barbed fitting and an outside barbed fitting, inside flexible tubing at one end connecting to said inside fitting to direct water to irrigate inside of said container and outside flexible tubing at one end connecting to said outside fitting and having connecting means on the other end of said outside flexible tubing adapted to connect to a source of water outside of said container.

3. The apparatus of claim 2 in which there is a low-volume control emitter fitting at the other end of said inside flexible tubing.

4. Drip irrigation apparatus for a container having a plant growing therein in soil in said container, comprising:

(a) said container having a through opening in its side, (b) a length of tubing extending from outside of said opening to inside of said opening, (c) an inside adapter and an outside adapter on opposite ends of said length of tubing in abutting relationship to said container on the inside and outside thereof respectively, said adapters having larger outside diameters than the diameter of said opening whereby said adapters seal said opening against loss of said soil therethrough, and (d) said inside adapter and said outside adapter having extending inwardly and outwardly thereof respectively an inside barbed fitting and an outside barbed fitting, whereby inside flexible tubing can be connected to said inside barbed fitting to direct water to irrigate inside of said container and whereby outside flexible tubing can be connected to said outside barbed fitting to connect to a source of water outside of said container.

5. Drip irrigation apparatus for a container to contain soil and to have a plant growing in said soil, comprising:
   (a) said container having a through opening in its side,
   (b) a length of tubing extending from outside of said opening to inside of said opening,
   (c) an inside adapter and an outside adapter on opposite ends of said length of tubing in abutting relationship to said container on the inside and outside thereof respectively, said adapters having larger outside diameters than the diameter of said opening whereby said adapters seal said opening against loss of soil therethrough, and
   (d) said inside adapter and said outside adapter having extending inwardly and outwardly thereof respectively an inside barbed fitting and an outside barbed fitting, whereby flexible tubing can be connected to said inside barbed fitting to direct water to irrigate inside of said container and whereby flexible tubing can be connected to said outside barbed fitting to connect to a source of water outside of said container.

6. The apparatus of claim 5 in which said length of tubing is formed of firm PVC material and has threaded ends and said adapters are female adapters and are threaded and receive and are threadedly engaged with said threaded ends of said length of tubing.

7. The apparatus of claim 5 in which said length of tubing is formed of firm unthreaded PVC material and said adapters are female adapters and are unthreaded and receive the ends of said length of tubing and are bonded to said length of tubing.

8. The apparatus of claim 5 in which there is a washer installed on said length of tubing between said inside adapter and said opening.

9. The apparatus of claim 5 in which one of said adapters is a male adapter and said length of tubing is an integral part of said male adapter and the other of said adapters is a female adapter receiving and secured to said length of tubing.

10. Drip irrigation apparatus for a container to contain soil and to have a plant growing in said soil, comprising:
   (a) said container having a straight through opening from the outside to the inside thereof,
   (b) a length of tubing extending from outside of said opening to inside of said opening,
   (c) an inside adapter and an outside adapter on opposite ends of said length of tubing in abutting relationship to said container on the inside and outside thereof respectively, said adapters having larger outside diameters than the diameter of said opening whereby said adapters seal said opening against loss of soil therethrough, and
   (d) said inside adapter and said outside adapter having extending inwardly and outwardly thereof respectively an inside barbed fitting and an outside barbed fitting, whereby flexible tubing can be connected to said inside barbed fitting to direct water to irrigate inside of said container and whereby flexible tubing can be connected to said outside barbed fitting to connect to a source of water outside of said container.

* * * * *